(12) United States Patent
Snodgrass et al.

(10) Patent No.: US 7,639,708 B1
(45) Date of Patent: Dec. 29, 2009

(54) METHOD FOR DYNAMICALLY REALLOCATING BANDWIDTH TO ACCOMMODATE BURSTY TRAFFIC IN A WIRELESS NETWORK

(75) Inventors: Timothy E. Snodgrass, Palo, IA (US); Jeffrey D. Bouis, Frisco, TX (US); Alan D. Amis, Plano, TX (US); Fred D. Mabe, Marion, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 439 days.

(21) Appl. No.: 11/703,030

(22) Filed: Feb. 5, 2007

(51) Int. Cl.
*H04L 12/43* (2006.01)
(52) U.S. Cl. .................. 370/458; 370/431; 455/403; 455/422.1; 455/450; 455/451
(58) Field of Classification Search .............. 370/431, 370/442, 458, 459, 460, 461, 462; 450/403, 450/422.1, 450, 451
See application file for complete search history.

(56) References Cited

U.S. PATENT DOCUMENTS

| | | | | |
|---|---|---|---|---|
| 6,771,985 | B1 * | 8/2004 | Iinuma | 455/561 |
| 2002/0024930 | A1 * | 2/2002 | Sestito | 370/224 |
| 2005/0053027 | A1 * | 3/2005 | Lampin et al. | 370/321 |
| 2005/0265338 | A1 * | 12/2005 | Chapman et al. | 370/389 |

* cited by examiner

*Primary Examiner*—William Trost, IV
*Assistant Examiner*—Charles C Jiang
(74) *Attorney, Agent, or Firm*—Matthew J. Evans; Daniel M. Barbieri

(57) ABSTRACT

A method for reallocating bandwidth includes assigning a node to a position message slot, running an allocation algorithm, generating a table based on the allocation algorithm, selecting a row of the table, aligning a value of the row with a node identifier; and assigning the node to a mini-slot within the position message slot based on the aligning of the value of the row and the node identifier.

17 Claims, 4 Drawing Sheets

METHOD FOR DYNAMICALLY REALLOCATING BANDWIDTH TO ACCOMMODATE BURSTY TRAFFIC IN A WIRELESS NETWORK

FIELD OF THE INVENTION

The present invention relates generally to the field of wireless networking, and more particularly to a method for dynamically reallocating bandwidth to accommodate bursty traffic in a wireless network.

BACKGROUND OF THE INVENTION

A mobile ad-hoc network (MANET) is a self-configuring network of mobile router nodes, e.g. wireless laptop personal computers but including airborne, fixed, maritime, vehicular, dismounted and handheld applications, forming a topology. The router nodes may organize themselves in a peer-to-peer, computer-to-computer manner without the use of a central base station (access point). MANETS may be utilized in systems such as the Tactical Data Radio System (TDRS) and the Joint Tactical Radio System (JTRS).

Self-forming ad hoc networking protocols such as MANETS are typically able to schedule continuous-flow user data in an efficient manner. In some instances, however, bursty data is required to be scheduled and transmitted. Bursty data generally refers to communications characterized by high volumes of data transmitted intermittently, as opposed to steady-stream data. These data transmissions often have a low duty cycle and transmit data in multiple periods of short duration. Bursty user data does not typically schedule efficiently. This may be particularly true when the data has low network latency. The poor scheduling limitation generally places a burden upon the signal in space, making current scheduling and transmission methods inefficient, and, in some networks, unusable.

Consequently, it would be advantageous if a method existed which provided dynamic reallocation of bandwidth to accommodate bursty traffic in a wireless network.

SUMMARY OF THE INVENTION

Accordingly, the various embodiments of the present invention are directed to a method for dynamically reallocating bandwidth to accommodate bursty traffic in a wireless network.

According to an aspect of a first embodiment of the present invention, a method for dynamically reallocating bandwidth to accommodate bursty traffic in a wireless network may comprise assigning a node to a position message slot. The plurality of position message slots may further comprise a plurality of dedicated mini slots. A node requiring transmission in a time slot may vote in a mini slot. There may be "n" number of opportunities for a voting node to transmit in a time slot. Initial voting order may be pre-determined based on a node identifier. Method may run a node allocation algorithm. Method may further comprise generating a permutation table based on the allocation algorithm suitable for providing a mini slot assignment for a node. Method may select a row of said permutation table and align the row of the permutation table with a node identifier of the node. Method may assign a node to a mini-slot within the position message slot based on the combination of the selected row and the node identifier. The structure of m-choose-n transmissions may allow a selection of slots to service a larger number of nodes and supply lower peak and average latency than if the larger number of nodes had to equally share a fixed amount of bandwidth.

It is to be understood that both the foregoing general description and the following detailed description are exemplary and explanatory only and are not restrictive of the invention claimed. The accompanying drawings, which are incorporated in and constitute a part of the specification, illustrate an embodiment of the invention and together with the general description, serve to explain the principles of the invention.

BRIEF DESCRIPTION OF THE DRAWINGS

The numerous objects and advantages of the present invention may be better understood by those skilled in the art by reference to the accompanying figures in which.

DETAILED DESCRIPTION OF THE INVENTION

Reference will now be made in detail to presently preferred embodiments of the invention, examples of which are illustrated in the accompanying drawings.

Figure 1:
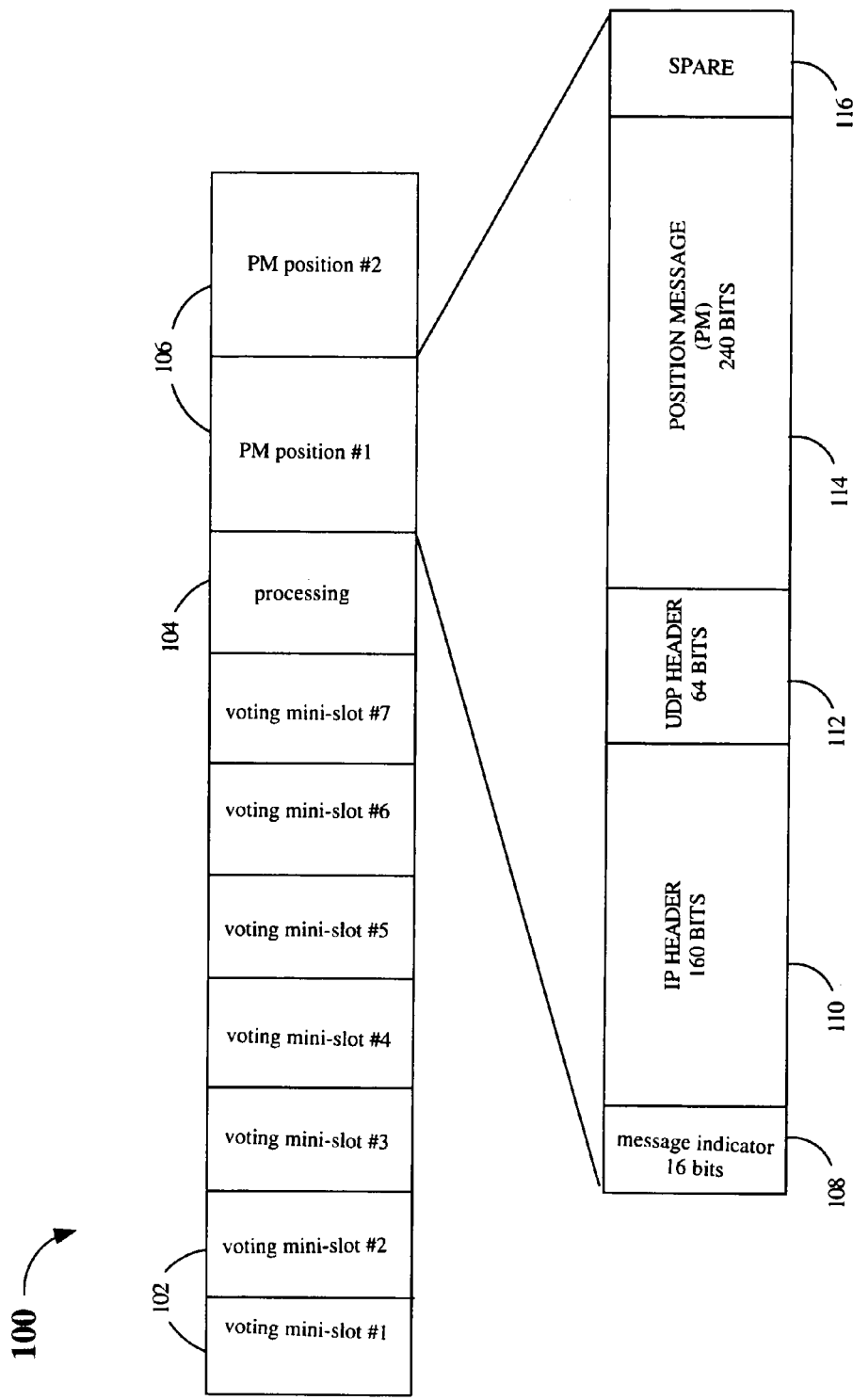
FIG. 1 is a diagram illustrating position message slot format utilized with the various embodiments of the present invention.

Referring to FIG. 1, a diagram illustrating the format of position message slots which may be utilized with the various embodiments of the present invention is shown. A frame may be comprised of a plurality of voting mini-slots 102 wherein a node may have an opportunity to vote. In the example illustrated in FIG. 1, there may be 7 mini-slots 102 providing seven voting opportunities. A processing slot 104 dedicated to processing such as propagation delays, processing delay, training, synthesizing and the like, or any suitable precedent slot may be present, but may not participate in a vote. Rather, the processing slot 104 may be a nod suitable for listening and determining if a slot is available. At least one position message slot 106 may follow the plurality of voting mini slots. A position message transmission slot 106 may comprise a voting mechanism that allows exclusive access to a slot. Selection of what IP datagrams may use the Position Message slots may be based on type of service (TOS) field in the datagram IP header It is contemplated that the size and type of data in the position slot could be any type of data. Position messages are intended for 1-hop neighbors, generally have low latency requirements.

A waveform may transmit a contention voting slot command to indicate a desired voting slot. The waveform may not indicate a payload slot voting choice. The SiS may receive all precedent voting slots. The SiS may select a payload slot by selecting a payload slot randomly, if no payload slot has been claimed in earlier voting slots, selecting the unselected payload slot if a payload slot has been selected, not selecting either payload slot if both payload slots have already been selected. Non selection may be reported in a slot completion report. If the SiS selects a payload slot, the SiS may transmit in the payload slot. If the SiS is not transmitting in the payload slot, the SiS may receive in the payload slot.

Figure 2:
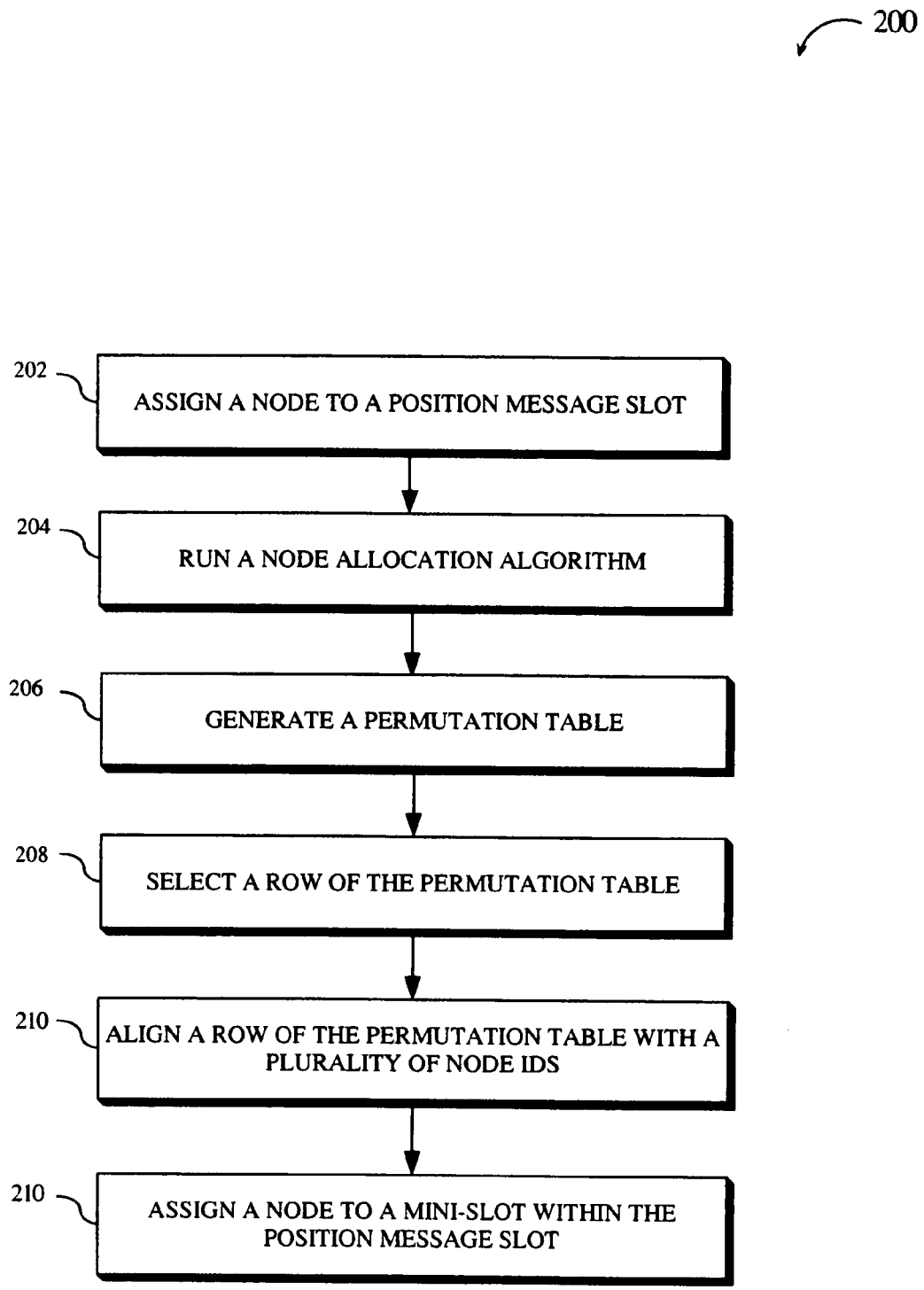
FIG. 2 is a flow diagram illustrating a method for dynamically reallocating bandwidth to accommodate bursty traffic in a wireless network in accordance with an exemplary embodiment of the present invention.
Figure 3:
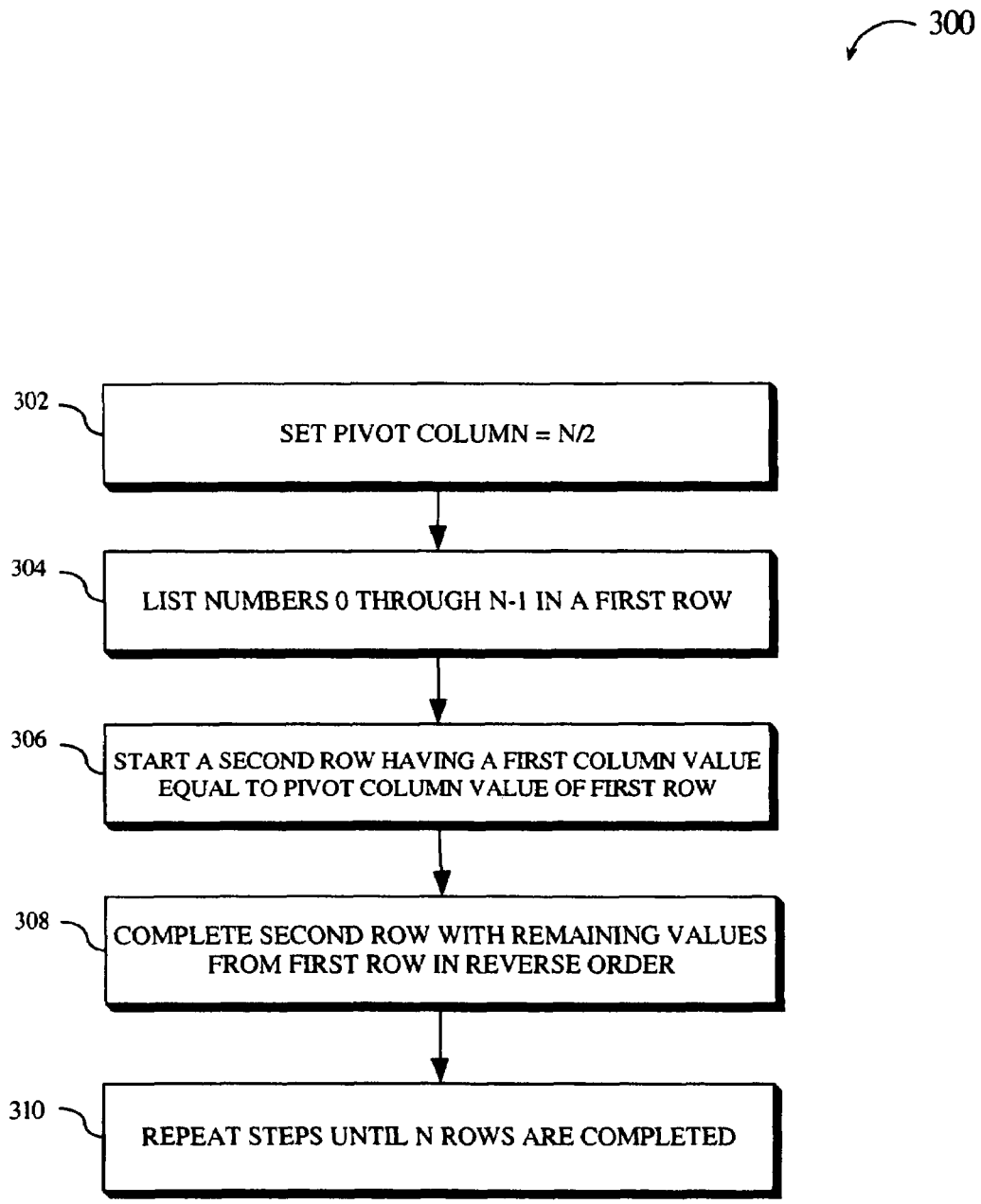
FIG. 3 is a flow diagram illustrating a sub-process of a method for dynamically reallocating bandwidth to accommodate bursty traffic in a wireless network in accordance with an exemplary embodiment of the present invention.

Referring to FIG. 2, a flow diagram of method 200 for dynamically reallocating bandwidth to accommodate bursty traffic in a wireless network in accordance with an exemplary embodiment of the present invention is shown. Method may be implemented with position message voting scheme for a position message transmission, such as is illustrated in FIG. 1 to provide increased fairness in voting. Method 200 may comprise assigning a node to a position message slot 202. Method may determine a number of nodes requiring position message slot assignment. A wireless network may comprise a maximum number of nodes suitable for transmission. The maximum number of nodes may be configured in a communications plan. For instance, in the TDRS radio frequency network, the maximum number of nodes may be configured in a COMMPLAN or like standard communications plan. The maximum number of nodes in a network may be referred to as MAX_NODES. Method 200 may also determine the number of position message slots per mini-frame in the network. The number of position message slots per mini-frame may also be set in the communications plan, and may be referred to as NUM_SLOTS.

A position message slot may be algorithmically assigned to a plurality of nodes. To illustrate node assignment to a position message slot, reference may be made to an example, wherein NUM_SLOTS may be 10, and MAX_NODES may range anywhere from 1 to 76. It is contemplated, however, that a method in accordance with an embodiment of the present invention may utilize any combination of slots and nodes as well as any quantity of slots or nodes as determined by the method. Nodes may be distributed among the available position message slots substantially evenly. In one embodiment, assignment of the remainder of nodes may be accomplished by assigning each position message slot MAX_NODES divided by NUM_SLOTS nodes in sequential order. A position message slot may be assigned one additional node until all nodes have been assigned to a position message slot. For example, if MAX_NODES=34 and NUM_SLOTS=10, then a position message slot may be assigned three nodes (for 30 nodes), and four of the position message slots may be assigned one additional node. With continued reference to the example where MAX_NODES=34 and NUM_SLOTS=10, with node values beginning at 0, the following allocation may result:

| PM Slot 0: | nodes | 1 | 2 | 3 | 31 |
|---|---|---|---|---|---|
| PM Slot 1: | nodes | 4 | 5 | 6 | 32 |
| PM Slot 2: | nodes | 7 | 8 | 9 | 33 |
| PM Slot 3: | nodes | 10 | 11 | 12 | 34 |
| PM Slot 4: | nodes | 13 | 14 | 15 | |
| PM Slot 5: | nodes | 16 | 17 | 18 | |
| PM Slot 6: | nodes | 19 | 20 | 21 | |
| PM Slot 7: | nodes | 22 | 23 | 24 | |
| PM Slot 8: | nodes | 25 | 26 | 27 | |
| PM Slot 9: | nodes | 28 | 29 | 30 | |

A single position message slot may support a pre-determined number of nodes, such as, for example, the number of mini-slots+1 "phantom" mini-slot. Therefore, the values of MAX_NODES and NUM_SLOTS may be appropriately configured by a user to ensure enough position message slots are available for the number of nodes. In this manner, each node may be provided an opportunity to vote in a particular mini-slot for a payload in a position message slot.

Method 200 may also comprise running a node allocation algorithm 204 suitable for providing random node ordering in voting slots. It is contemplated that a node may be assigned to a mini-slot in a position message slot in an orderly manner, and may allow each node to vote in a reserved time slot. Voting may be accomplished in temporal order, for instance, the first in time to claim a slot is the winner. Because of this temporal voting order, nodes may not maintain the same ordering of mini-slots. For instance, continuing with the previously described example, if nodes 19 and 20 are located in the same position message slot, node 19 may always be assigned a mini-slot ahead of node 20, as node 19 may always have the advantage when voting for the limited pool of data slots.

Node ordering may be rearranged pseudo-randomly. However, such a pseudo random rearrangement may still permit a node to be preferred or discriminated against for a long period of time. To accomplish fairness in voting order, method 200 may run the allocation algorithm 204. Voting order may be modified from one mini-frame to the next based on the position message slot allocation algorithm. The allocation algorithm may be a sub-process 300 of method 200 suitable for generating a permutation table for N number of nodes in a network. Sub-process 300 for generating a permutation table may comprise setting a pivot column 302. For instance, pivot column may be N/2, ignoring remainders. Sub-process 300 may further comprise listing the node values 0—N−1 in a row 304. A first node value may be zero; therefore, the first row may be row 0. Sub-process 300 may begin a second row where the value in the first column of the second row, i.e., column 0, is the value in the pivot column of the previous row 306. Sub-process 300 may complete the second row with the remaining values from the first row in reverse order 308. For instance, a second row, in this example, row 1, may be created by listing the value in the pivot column of row 0, "3" may be listed first. All remaining values of row 0 may be brought down to row 1 in reverse order. Sub-process 300 may further comprise repeating the steps of beginning a new row with a pivot column value of the previous row and completing the row with the values of the previous row in the reverse order 310. Sub-process 300 may repeat until N rows are completed. In this embodiment, all counts, such as row and column numbers, may begin at 0. However, row and column numbers may begin at any suitable value or any value desired by a user. In the current example, permutation table generation may result in the following:

| | | pivot column | | | | |
|---|---|---|---|---|---|---|
| 0 | 1 | 2 | 3 | 4 | 5 | // row 0 |
| 3 | 5 | 4 | 2 | 1 | 0 | // row 1 |
| 2 | 0 | 1 | 4 | 5 | 3 | // row 2 |
| 3 | 5 | 1 | 0 | 2 | | // row 3 |
| 1 | 2 | 0 | 5 | 3 | 4 | // row 4 |
| 5 | 4 | 3 | 0 | 2 | 1 | // row 5 |

It is contemplated that if steps 306 and 308 are repeated without stopping, the pattern may repeat again. For example, after N−1 iterations, in this instance, 5 iterations, the cycle may repeat. In the current example, if the first row is row 0, then row N is the same as row 0, rows 1 and N+1 are the same, and the like. A table for N=6 continued beyond row 5, may be constructed, where the column values of row 6 are equivalent to the column values of row 0 and the column values of row 7 are equivalent to the column values of row 1, as demonstrated in the table by:

| pivot column | | | | | | |
|---|---|---|---|---|---|---|
| 0 | 1 | 2 | 3 | 4 | 5 | // row 0 |
| 3 | 5 | 4 | 2 | 1 | 0 | // row 1 |
| 2 | 0 | 1 | 4 | 5 | 3 | // row 2 |
| 4 | 3 | 5 | 1 | 0 | 2 | // row 3 |
| 1 | 2 | 0 | 5 | 3 | 4 | // row 4 |
| 5 | 4 | 3 | 0 | 2 | 1 | // row 5 |
| 0 | 1 | 2 | 3 | 4 | 5 | // row 6 == row 0 |
| 3 | 5 | 4 | 2 | 1 | 0 | // row 7 == row 1 |

Each value in the table may experience a similar oscillating cycle; however, the values may be slightly out of phase with each other. This property may create a set of cyclic permutations, ensuring fairness in ordering, i.e., every value precedes every other value an equal number of times. For example, in the six unique rows above, the value "1" precedes "4" three times and follows "4" three times. This property is useful for providing increased fairness in a voting scheme, as the first to claim a slot is considered be the winner and may transmit in the requested slot. To further illustrate the oscillating cycle, below is the same table but with the particular value of 0 highlighted:

| pivot column | | | | | | |
|---|---|---|---|---|---|---|
| 0 | 1 | 2 | 3 | 4 | 5 | // row 0 |
| 3 | 5 | 4 | 2 | 1 | 0 | // row 1 |
| 2 | 0 | 1 | 4 | 5 | 3 | // row 2 |
| 4 | 3 | 5 | 1 | 0 | 2 | // row 3 |
| 1 | 2 | 0 | 5 | 3 | 4 | // row 4 |
| 5 | 4 | 3 | 0 | 2 | 1 | // row 5 |
|   | 1 | 2 | 3 | 4 | 5 | // row 6 == row 0 |
| 3 | 5 | 4 | 2 | 1 | 0 | // row 7 == row 1 |

It is to be noted that the desired oscillation is not present when N is odd, as demonstrated by the following table for N=7:

| pivot column | | | | | | | |
|---|---|---|---|---|---|---|---|
| 0 | 1 | 2 | 3 | 4 | 5 | 6 | // row 0 |
| 3 | 6 | 5 | 4 | 2 | 1 | 0 | // row 1 |
| 4 | 0 | 1 | 2 | 5 | 6 | 3 | // row 2 |
| 2 | 3 | 6 | 5 | 1 | 0 | 4 | // row 3 |
| 5 | 4 | 0 | 1 | 6 | 3 | 2 | // row 4 |
| 1 | 2 | 3 | 6 | 0 | 4 | 5 | // row 5 |
| 6 | 5 | 4 | 0 | 3 | 2 | 1 | // row 6 |

It may be impossible for "1" to defeat "4" in an equal number of voting opportunities, as "1" lags in four instances and leads in three instances due to the odd number of rows. In this situation, "1" defeats "4" three times but "1" loses to "4" four times, resulting in "4" gaining a long-term advantage.

To provide greater equality in value occurrence, i.e., to ensure that every value occurs before every other value an equal number of times, sub-process 300 may further comprise generating a second set of N rows, providing an even number of rows in the permutation table. This will generate a table of 2N rows by N columns, which may be utilized to provide fairness in voting. In this embodiment, N rows may be constructed in reverse order, with the row values reversed. Thus, row N+x is the reverse of row N−1−x, where x goes from 0 to N−1. In this example, row 7 is the reverse of row 6, row 8 is the reverse of row 5, row 9 is the reverse of row 4, row 10 is the reverse of row 3, rows 11 is the reverse of row 2, row 12 is the reverse of row 1 and row 13 is the reverse of row 0:

| pivot column | | | | | | | |
|---|---|---|---|---|---|---|---|
| 0 | 1 | 2 | 3 | 4 | 5 | 6 | // 0 |
| 3 | 6 | 5 | 4 | 2 | 1 | 0 | // 1 |
| 4 | 0 | 1 | 2 | 5 | 6 | 3 | // 2 |
| 2 | 3 | 6 | 5 | 1 | 0 | 4 | // row 3 |
| 5 | 4 | 0 | 1 | 6 | 3 | 2 | // row 4 |
| 1 | 2 | 3 | 6 | 0 | 4 | 5 | // row 5 |
| 6 | 5 | 4 | 0 | 3 | 2 | 1 | // row 6 |
| 1 | 2 | 3 | 0 | 4 | 5 | 6 | // row 7 (reverse row 6) |
| 5 | 4 | 0 | 6 | 3 | 2 | 1 | // row 8 (reverse row 5) |
| 2 | 3 | 6 | 1 | 0 | 4 | 5 | // row 9 (reverse row 4) |
| 4 | 0 | 1 | 5 | 6 | 3 | 2 | // row 10 (reverse row 3) |
|   | 6 | 5 | 2 | 1 | 0 | 4 | // row 11 (reverse row 2) |
| 0 | 1 | 2 | 4 | 5 | 6 | 3 | // row 12 (reverse row 1) |
| 6 | 5 | 4 | 3 | 2 | 1 | 0 | // row 13 (reverse row 0) |

Figure 4:
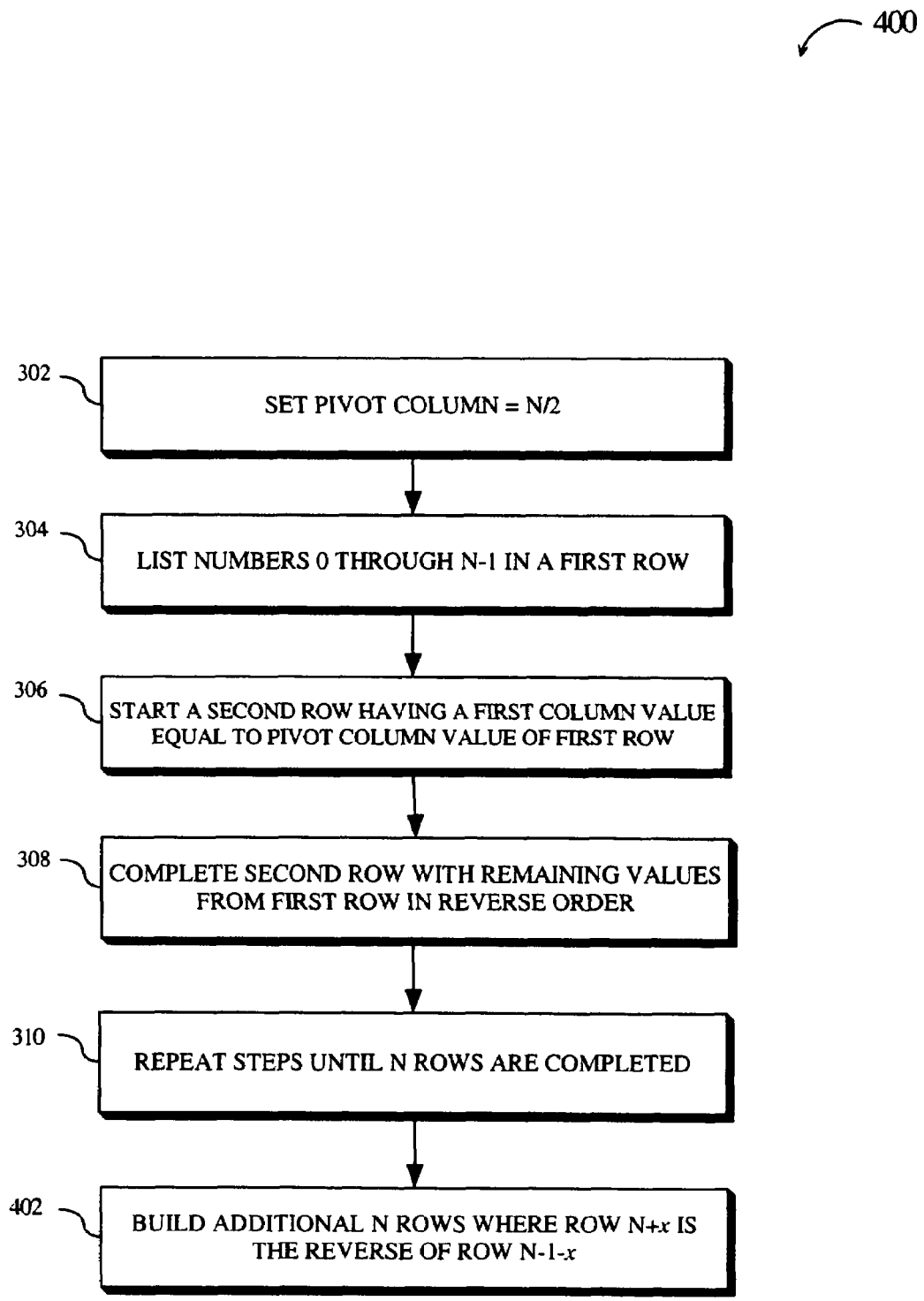
FIG. 4 is a flow diagram illustrating an additional embodiment of a sub-process of a method for dynamically reallocating bandwidth to accommodate bursty traffic in a wireless network in accordance with an exemplary embodiment of the present invention.

Doubling the number of rows provides an even number of rows, and reversing the values in the second set of rows may provide increased fairness in voting. For example, in the first set of rows, "1" defeats "4" only three times and loses four times; therefore, when the rows are reversed, "1" defeats "4" four times and loses three. Thus "1" defeats "4" for a total of seven times, and loses to "4" seven times as well. Create an additional N rows by working backwards:

Referring to FIG. 4, a flow diagram illustrating an additional embodiment of a sub-process 400 of a method for dynamically reallocating bandwidth to accommodate bursty traffic in a wireless network in accordance with an exemplary embodiment of the present invention is illustrated. Sub-process 400 may comprise the steps 302-310 of sub-process 300 and may also comprising building an additional N rows where row N+x is the reverse of row N−x−1 402. For instance, in the current example, sub-process 300 may reverse row 6, row 5, row 4, and the like. Reversing row ordering may spread the initial row values more fairly among the rows. In the current example, where N=7, if row 0 is reversed, followed by reversing row 1, and the like, in that order, row 6 and row 7 may begin with "6 5 4", thus giving those values back-to-back advantages over all other values.

If N is even a second set of rows may not be created, however, it is contemplated that sub-process 300 may generate the second set of rows automatically, by a user request, or the like whether or not N is even. Additionally, table may be generated when it is known what values are needed, for example when the waveform is instantiated, or when desired by a user.

Method 200 may generate a table of permutations 206 based on the allocation algorithm to arrange the ordering of nodes in voting slots and provide maximum fairness. As described in the sub-process 300 for running an allocation algorithm, table may generated consisting of 2N rows, where N is the total number of nodes and each row comprises node values 0 through N−1 permuted. For example, the permutation table for N=3 may be as follows:

| 0 | 1 | 2 | // row 0 |
|---|---|---|---|
| 1 | 2 | 0 | // row 1 |
| 2 | 0 | 1 | // row 2 |
| 1 | 0 | 2 | // row 3 |
| 0 | 2 | 1 | // row 4 |
| 2 | 1 | 0 | // row 5 |

The values of the table may be utilized to determine mini-slot occupation for a node in a given position message slot.

Method 200 may comprise selecting rows of the permutation tables 208. A row may be interpreted to represent a plurality of mini-slot positions. A row may be selected to allow node transmission within position message slot. The rows of the permutation tables may be selected in a sequential manner, cycling back to row 0 after row 2N−1 has been utilized. In addition, every node may run a substantially similar algorithm, i.e., selecting the same rows for each position message slot. This may ensure that only one node transmits in a given mini-slot at a given time.

To achieve this, a first row, such as row 0, may be utilized for all position message slots occurring in the first mini-frame beginning at reference network time 0. A second row, such as row 1, may then be utilized for all position message slots in a subsequent mini-frame. A third row, in this instance, row 2, may then be utilized for the next mini-frame. Row selection may cycle back to row 0 after 2N mini-frames, and the process of row selection may continue. Row selection may be calculated as:

row=floor($tx\_time_1$*$num\_miniframes\_per\_second$) modulo(2*$N$)

where $tx\_time_1$ is the full-precision network time that the position message slot will begin, N is the number of nodes assigned to that position message slot, and the row is selected from the permutation table corresponding to N.

Method 200 may comprise aligning the plurality of mini-slots with the node identifiers (IDs) 210 to determine node assignment to a particular mini-slot. A node ID may be a numerical tag or name given to each network node to distinguish it from other network nodes. For instance, a node ID may be a hardware address such as a MAC address that uniquely identifies each node of a network, a Data Link Control (DLC) address or the like. Node IDs may be assigned according to the potential size of a network. The network may attempt to assign a unique node ID to each node in the network which may be broadcast to all other nodes in the network. Alternatively, nodes may self-select a unique node identifier, and may broadcast the self-selected node identifier to the rest of the nodes in the network.

Method 200 may determine slot assignment based on the combination of row selection and node identifier. Continuing the example, note that position message slot 6 is allocated nodes {, 20, 21}. Because slot 6 comprises 3 nodes, the permutation table for N=3 above is utilized. When the time for position message slot 6 arrives for transmission, a row, for example row 2 of the table, may be selected. For example, node 19 may be assigned to mini-slot 2, node 20 may be assigned to mini-slot 0, and node 21 may be assigned to mini-slot 1 within the position message slot, as demonstrated in the table by:

| 19 | 20 | 21 | // node ids (PM Slot 6) |
|----|----|----|-------------------------|
| 2  | 0  | 1  | // mini-slots (row 2)   |

In another example, position message slot 1 may be allocated nodes {4, 5, 6, 32}. Because slot 1 comprises four nodes, the permutation table for N=4 is utilized:

| 0 | 1 | 2 | 3 | // row 0 |
|---|---|---|---|----------|
| 2 | 3 | 1 | 0 | // row 1 |
| 1 | 0 | 3 | 2 | // row 2 |
| 3 | 2 | 0 | 1 | // row 3 |
| 1 | 0 | 2 | 3 | // row 4 |
| 2 | 3 | 0 | 1 | // row 5 |
| 0 | 1 | 3 | 2 | // row 6 |
| 3 | 2 | 1 | 0 | // row 7 |

With continued reference to the present example, row 2 may be selected when position message slot 1 is to transmit. Therefore, node 4 may be assigned to mini-slot 1, node 5 may be assigned to mini-slot 0, node 6 may be assigned to mini-slot 3, and node 32 may be assigned mini-slot 2 for the current transmission of position message slot 1:

| 4 | 5 | 6 | 32 | // node ids (PM Slot 1) |
|---|---|---|----|-------------------------|
| 1 | 0 | 3 | 2  | // mini-slots (row 2)   |

Though not utilized in the examples here, note that if MAX_NODES is large relative to NUM_SLOTS, a node may occasionally be assigned to the "phantom" quiet mini-slot.

Method 200 may further comprise permuting the order of the plurality of position message slots between mini-frames. That is, in one mini-frame the position message slots may transmit in order 0 to NUM_SLOTS, but in the next mini-frame they may be in a very different order. Permuting the order of the plurality of position message slots between mini-frames may be accomplished utilizing a process similar to the row selection process. In one embodiment, a permutation table corresponding to NUM_SLOTS may be generated, and row selection from this table fixes the order of position message slots for the given mini-frame. To select the correct row, a similar selection equation is utilized:

row=floor($tx\_time_2$*$num\_miniframes\_per\_second$) modulo(2*$NUM\_SLOTS$)

where $tx\_time_2$ is the full-precision network time at which the mini-frame begins, rather than each individual position message slot.

Continuing the example where NUM_SLOTS=10, method 200 may generate the following table:

| 0 | 1 | 2 | 3 | 4 | 5 | 6 | 7 | 8 | 9 | // row 0  |
|---|---|---|---|---|---|---|---|---|---|-----------|
| 5 | 9 | 8 | 7 | 6 | 4 | 3 | 2 | 1 | 0 | // row 1  |
| 4 | 0 | 1 | 2 | 3 | 6 | 7 | 8 | 9 | 5 | // row 2  |
| 6 | 5 | 9 | 8 | 7 | 3 | 2 | 1 | 0 | 4 | // row 3  |
| 3 | 4 | 0 | 1 | 2 | 7 | 8 | 9 | 5 | 6 | // row 4  |
| 7 | 6 | 5 | 9 | 8 | 2 | 1 | 0 | 4 | 3 | // row 5  |
| 2 | 3 | 4 | 0 | 1 | 8 | 9 | 5 | 6 | 7 | // row 6  |
| 8 | 7 | 6 | 5 | 9 | 1 | 0 | 4 | 3 | 2 | // row 7  |
| 1 | 2 | 3 | 4 | 0 | 9 | 5 | 6 | 7 | 8 | // row 8  |
| 9 | 8 | 7 | 6 | 5 | 0 | 4 | 3 | 2 | 1 | // row 9  |
| 1 | 2 | 3 | 4 | 0 | 5 | 6 | 7 | 8 | 9 | // row 10 |
| 8 | 7 | 6 | 5 | 9 | 0 | 4 | 3 | 2 | 1 | // row 11 |
| 2 | 3 | 4 | 0 | 1 | 9 | 5 | 6 | 7 | 8 | // row 12 |
| 7 | 6 | 5 | 9 | 8 | 1 | 0 | 4 | 3 | 2 | // row 13 |
| 3 | 4 | 0 | 1 | 2 | 8 | 9 | 5 | 6 | 7 | // row 14 |
| 6 | 5 | 9 | 8 | 7 | 2 | 1 | 0 | 4 | 3 | // row 15 |
| 4 | 0 | 1 | 2 | 3 | 7 | 8 | 9 | 5 | 6 | // row 16 |
| 5 | 9 | 8 | 7 | 6 | 3 | 2 | 1 | 0 | 4 | // row 17 |
| 0 | 1 | 2 | 3 | 4 | 6 | 7 | 8 | 9 | 5 | // row 18 |
| 9 | 8 | 7 | 6 | 5 | 4 | 3 | 2 | 1 | 0 | // row 19 |

Therefore, in this example, if the network time of the mini-frame start is, for instance, 2154984.4783 (counting from reference time 0), and the network is configured at 4 mini-frames per second, method 200 may select the corresponding row, in this instance, row 17. If the corresponding row is utilized to determine the ordering of the position message slots, the result in this example is that position message slot 0 is the 5th to transmit, position message slot 1 transmits 9th, position message slot 2 transmits $8^{th}$, and subsequent position message slots transmit in a like manner, with position message slot 9 being the 4th to transmit, as illustrated by the following table:

| | |
|---|---|
| 0 1 2 3 4 5 6 7 8 9 | // PM Slot |
| 5 9 8 7 6 3 2 1 0 4 | // tx order (row 17) |

Note this process only affects the order of position message slot transmission. The same nodes may always be allocated to the same position message slots. That is, position message slot 1 may always comprise nodes {4, 5, 6, 3, 2} in our example, and row selection is still utilized for determining which mini-slots within the position message slot each node is assigned to. However, the position message slots may be reordered, enabling a position message slot to be transmitted anywhere in the sequence of position message slots within a mini-frame.

Method 200 may comprise a node listening to hear if any precedent node in the voting order advertises the node will be transmitting their position message in one of the available positions. If more than one position message position is available, the voting node may randomly select a slot, reducing the chances of hidden-node. If a node is not voting for a position message payload slot, the node may not transmit during the node's voting slot. A node may vote for a particular position message slot by transmitting a specific bit pattern identifying the position message slot. A node may not vote for an unavailable position message payload slot, such as a previously voted on slot.

In an additional embodiment, method 200 may comprise building an additional 2N×N table, wherein the first row of the table is a fixed permutation of the original table's first row. Method 200 may interleave the rows of the two tables. For example, a table may be constructed having the configuration: first permutation table, second permutation table, reversed rows of first table, and reversed rows of second table. In this manner, method 200 may construct a 4N×N table, further ensuring increased fairness in voting. Specifically, constructing a 4N×N table may resolve instances where two or more numbers recurringly appear together in table. For example, in some instances, the relative positions of values "1" and "2" tend to appear together. In the example described, "1" and "2" are together in left half of the table and "1" always comes before "2". Also, when "1" and "2" are together in the right half of the table, "2" always comes before "1". This recurrence may be the result of the oscillating property of the permutation technique. In some instances, it may be undesirable because an earlier voting node may have an advantage.

Thus, method 200 may provide fairness in a specific section of a permutation table, such as for the first half of the table. To this end, method 200 may run the permutation again beginning at a different initial row. Specifically, the initial row of the new permutation should be the original row (values 0, 1, . . . N−1) but with the left and right halves of that row swapped. The pivot column (position P) provides the "halfway" mark for the swap: the values from P to N−1 begin the new row, then values 0 through P−1 comprise the rest of the row. Continuing our example with N=7, we see the new table that is formed:

pivot column

| 0 | 1 | 2 | 3 | 4 | 5 | 6 | // original row 0 |
|---|---|---|---|---|---|---|---|
| 3 | 4 | 5 | 6 | 0 | 1 | 2 | // new row 0 |
| 6 | 2 | 1 | 0 | 5 | 4 | 3 | // new row 1 |
| 0 | 3 | 4 | 5 | 1 | 2 | 6 | // new row 2 |
| 5 | 6 | 2 | 1 | 4 | 3 | 0 | // new row 3 |
| 1 | 0 | 3 | 4 | 2 | 6 | 5 | // new row 4 |
| 4 | 5 | 6 | 2 | 3 | 0 | 1 | // new row 5 |
| 2 | 1 | 0 | 3 | 6 | 5 | 4 | // new row 6 |

In this new table, "2" now comes before "1" when they are together in the left half, and if the rows are reversed that pattern will continue. A table of 4N rows by N columns may then be generated where row 2N+x is the reverse of row x, where x goes from 0 to 2N−1. For the example of N=7, a 28×7 table may be generated:

| | | | pivot column | | | | | |
|---|---|---|---|---|---|---|---|---|
| 0 | 1 | 2 | 3 | 4 | 5 | 6 | // row 0 | first |
| 3 | 6 | 5 | 4 | 2 | 1 | 0 | // row 1 | permutation |
| 4 | 0 | 1 | 2 | 5 | 6 | 3 | // row 2 | table |
| 2 | 3 | 6 | 5 | 1 | 0 | 4 | // row 3 | |
| 5 | 4 | 0 | 1 | 6 | 3 | 2 | // row 4 | |
| 1 | 2 | 3 | 6 | 0 | 4 | 5 | // row 5 | |
| 6 | 5 | 4 | 0 | 3 | 2 | 1 | // row 6 | |
| 3 | 4 | 5 | 6 | 0 | 1 | 2 | // row 7 | second |
| 6 | 2 | 1 | 0 | 5 | 4 | 3 | // row 8 | permutation |
| 0 | 3 | 4 | 5 | 1 | 2 | 6 | // row 9 | table |
| 5 | 6 | 2 | 1 | 4 | 3 | 0 | // row 10 | |
| 1 | 0 | 3 | 4 | 2 | 6 | 5 | // row 11 | |
| 4 | 5 | 6 | 2 | 3 | 0 | 1 | // row 12 | |
| 2 | 1 | 0 | 3 | 6 | 5 | 4 | // row 13 | |
| 6 | 5 | 4 | 3 | 2 | 1 | 0 | // row 14 | reversed |
| 0 | 1 | 2 | 4 | 5 | 6 | 3 | // row 15 | rows of first |
| 3 | 6 | 5 | 2 | 1 | 0 | 4 | // row 16 | permutation |
| 4 | 0 | 1 | 5 | 6 | 3 | 2 | // row 17 | table |
| 2 | 3 | 6 | 1 | 0 | 4 | 5 | // row 18 | |
| 5 | 4 | 0 | 6 | 3 | 2 | 1 | // row 19 | |
| 1 | 2 | 3 | 0 | 4 | 5 | 6 | // row 20 | |
| 2 | 1 | 0 | 6 | 5 | 4 | 3 | // row 21 | reversed |
| 3 | 4 | 5 | 0 | 1 | 2 | 6 | // row 22 | rows of second |
| 6 | 2 | 1 | 5 | 4 | 3 | 0 | // row 23 | permutation |
| 0 | 3 | 4 | 1 | 2 | 6 | 5 | // row 24 | table |
| 5 | 6 | 2 | 4 | 3 | 0 | 1 | // row 25 | |
| 1 | 0 | 3 | 2 | 6 | 5 | 4 | // row 26 | |
| 4 | 5 | 6 | 3 | 0 | 1 | 2 | // row 27 | |

If a node requests to transmit a position message but fails to win the vote, the node may attempt to transmit the position message in a subsequent position message slot in which the node is permitted to vote on transmission. It is contemplated that the position message queue may be one entry deep and non-blocking. Therefore if subsequent position message arrives prior to a new vote, the subsequent, i.e., latest position message is the one to be transmitted. The latest position message passed from the Network layer may always transmit in the requested position message slot.

The various embodiments of the present invention provide improved scheduling for nodes in MANETS utilized in TDRS, JTRS systems and the like, where multiple channel groups have multiple communication links operating simultaneously within range of each other. Accordingly, it is contemplated that the various embodiments of the present invention may be implemented on the international TDRS program, as the embodiments enable responsive bandwidth to bursty user traffic demands in a TDMA structured network.

It is to be noted that the foregoing described embodiments according to the present invention may be conveniently implemented using conventional general purpose digital computers programmed according to the teachings of the present specification, as will be apparent to those skilled in the computer art. Appropriate software coding may readily be prepared by skilled programmers based on the teachings of the present disclosure, as will be apparent to those skilled in the software art.

It is to be understood that the present invention may be conveniently implemented in forms of a software package. Such a software package may be a computer program product which employs a computer-readable storage medium including stored computer code which is utilized to program a computer to perform the disclosed function and process of the present invention. The computer-readable medium may include, but is not limited to, any type of conventional floppy disk, optical disk, CD-ROM, magneto-optical disk, ROM, RAM, EPROM, EEPROM, magnetic or optical card, or any other suitable media for storing electronic instructions.

It is understood that the specific order or hierarchy of steps in the foregoing disclosed methods are examples of exemplary approaches. Based upon design preferences, it is understood that the specific order or hierarchy of steps in the method may be rearranged while remaining within the scope of the present invention. The accompanying method claims present elements of the various steps in a sample order, and are not meant to be limited to the specific order or hierarchy presented.

It is believed that the present invention and many of its attendant advantages will be understood by the foregoing description, and it will be apparent that various changes may be made in the form, construction, and arrangement of the components thereof without departing from the scope and spirit of the invention or without sacrificing all of its material advantages. The form herein before described being merely an explanatory embodiment thereof, it is the intention of the following claims to encompass and include such changes.

What is claimed:

1. A method for reallocating bandwidth comprising: assigning a node to a position message slot, said position message slot further comprising a plurality of mini-slots; running an allocation algorithm; generating, via a computer processor, a table based on said allocation algorithm, further including: setting a pivot column defining a plurality of pivot values; and building a first set of rows equivalent to a plurality of nodes, said building a first set of row further comprising: listing each of said plurality of nodes in a first row, said first row comprising a first pivot value; and listing each said plurality of nodes in a second row in a reverse order of said listing of said plurality of nodes in said first row and beginning with said first pivot value; selecting a row of said table; aligning a value of said row with a node identifier of said node; and assigning said node to one of said plurality of mini-slots within said position message slot based on said aliening of a value of said row and said node identifier of said node.

2. The method of claim 1, wherein said position message slot comprises a message indicator, an Internet Protocol Header, a User Datagram Protocol header, a position message and at least one additional data segment.

3. The method of claim 1, wherein said row represents an order of said plurality of mini-slots within said position message slots.

4. The method of claim 1, wherein said pivot column is defined as a total number of said plurality of nodes divided by two.

5. The method of claim 1, wherein the steps of listing each of said plurality of nodes in a first row, said first row comprising a first pivot value and listing each said plurality of nodes in a second row in a reverse order of said listing of said plurality of nodes in said first row and beginning with said first pivot value are repeated for each of said plurality of nodes.

6. The method of claim 5, further comprising building a second set of rows wherein each row of said second set of rows is a permutation of a corresponding row in said first set of rows.

7. The method of claim 1, further comprising permuting an order of a plurality of position message slots utilizing said allocation algorithm.

8. A computer readable medium having computer-executable instructions for performing a method for reallocating bandwidth, said method comprising:
assigning a node to a position message slot, said position message slot further comprising a plurality of mini-slots;
running a node allocation algorithm;
generating a table based on said allocation algorithm, further including:
setting a pivot column defining a plurality of pivot values; and
building a first set of rows equivalent to a plurality of nodes, said
building a first set of row further comprising:
listing each of said plurality of nodes in a first row, said first row
comprising a first pivot value; and
listing each said plurality of nodes in a second row in a reverse order of said listing of said plurality of nodes in said first row and beginning with said first pivot value;
selecting a row of said table;
aligning a value of said row with a node identifier of said node; and
assigning said node to one of said plurality of mini-slots within said position message slot based on said aligning of a value of said row and said node identifier of said node.

9. The computer readable medium of claim 8, wherein said row represents an order of said plurality of mini-slots within said position message slots.

10. The computer readable medium of claim 8, wherein said pivot column is defined as a total number of said plurality of nodes divided by two.

11. The computer readable medium of claim 8, wherein the steps of listing each of said plurality of nodes in a first row, said first row comprising a first pivot value and listing each said plurality of nodes in a second row in a reverse order of said listing of said plurality of nodes in said first row and beginning with said first pivot value are repeated for each of said plurality of nodes.

12. The computer readable medium of claim 11, further comprising building a second set of rows wherein each row of said second set of rows is a permutation of a corresponding row in said first set of rows.

13. The computer readable medium of claim 8, further comprising permuting an order of a plurality of position message slots utilizing said allocation algorithm.

14. A method for reallocating bandwidth via a computer processor comprising:
- assigning a node to a position message slot, said position message slot further comprising a plurality of mini slots; and
- assigning said node to one of said plurality of mini-slots within said position message slot, further comprising:
- running a node allocation algorithm;
- generating a table based on said allocation algorithm, further including:
  - setting a pivot column defining a plurality of pivot values; and
  - building a first set of rows equivalent to a plurality of nodes, said
  - building a first set of row further comprising:
    - listing each of said plurality of nodes in a first row, said first row comprising a first pivot value; and
    - listing each said plurality of nodes in a second row in a reverse order of said listing of said plurality of nodes in said first row and beginning with said first pivot value;
  - selecting a row of said table; and
  - aligning a value of said row with a node identifier of said node,
- wherein said assigning a node to one of said plurality of mini-slots within said position message is determined based on said aligning of said value of said row and said node identifier.

15. The method of claim 14, wherein the steps of listing each of said plurality of nodes in a first row, said first row comprising a first pivot value and listing each said plurality of nodes in a second row in a reverse order of said listing of said plurality of nodes in said first row and beginning with said first pivot value are repeated for each of said plurality of nodes.

16. The method of claim 14, further comprising building a second set of rows wherein each row of said second set of rows is a permutation of a corresponding row in said first set of rows.

17. The method of claim 16, further comprising building a third set of rows wherein each row of said third set of rows is a permutation of a corresponding row in said first set of rows and said second set of row.

\* \* \* \* \*